US011057292B1

United States Patent
Jain et al.

(10) Patent No.: US 11,057,292 B1
(45) Date of Patent: Jul. 6, 2021

(54) BORDER NODE TRAFFIC CONVERGENCE (71) Applicant: Cisco Technology, Inc., San Jose, CA (US)

(72) Inventors: Prakash Jain, Fremont, CA (US); Sanjay K. Hooda, Pleasanton, CA (US); Victor Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/566,714

(22) Filed: Sep. 10, 2019

Related U.S. Application Data (60) Provisional application No. 62/858,876, filed on Jun. 7, 2019.

(51) Int. Cl.
| | |
|---|---|
| H04L 12/66 | (2006.01) |
| H04L 12/751 | (2013.01) |
| H04L 29/06 | (2006.01) |
| H04L 12/707 | (2013.01) |

(52) U.S. Cl.
CPC .............. *H04L 45/02* (2013.01); *H04L 12/66* (2013.01); *H04L 45/22* (2013.01); *H04L 63/0227* (2013.01)

(58) Field of Classification Search
CPC ..... H04L 45/02; H04L 12/66; H04L 63/0227; H04L 45/22; H04L 45/56; H04B 1/0003
See application file for complete search history.

(56) References Cited

U.S. PATENT DOCUMENTS

| | | | |
|---|---|---|---|
| 6,973,023 B1* | 12/2005 | Saleh | ...................... H04L 12/66 370/217 |
| 9,294,393 B1 | 3/2016 | Mullooly et al. | |
| 9,912,584 B2 | 3/2018 | Maino et al. | |
| 2002/0114326 A1* | 8/2002 | Mahalingaiah | ..... H04L 61/2514 370/389 |
| 2002/0172149 A1* | 11/2002 | Kinoshita | ............. H04L 47/825 370/216 |
| 2011/0103255 A1* | 5/2011 | Ikeda | ...................... H04L 45/00 370/252 |
| 2014/0254406 A1* | 9/2014 | Anumala | ................ H04L 47/10 370/252 |
| 2019/0132209 A1 | 5/2019 | Hooda et al. | |

FOREIGN PATENT DOCUMENTS

CN 101124764 A * 2/2008 ........... H04L 1/0003

\* cited by examiner

*Primary Examiner* — Mohamed A Kamara
(74) *Attorney, Agent, or Firm* — Patterson + Sheridan, LLP (57) ABSTRACT

Techniques for network routing border convergence are described. Backup paths for external connections for a network are established and provide for a temporary path for network traffic during network routing convergence, preventing traffic loss at network border nodes.

20 Claims, 6 Drawing Sheets

BORDER NODE TRAFFIC CONVERGENCE

CROSS-REFERENCE TO RELATED APPLICATIONS

This application claims benefit of U.S. Provisional Patent Application Ser. No. 62/858,876, entitled "Border Node Traffic Convergence," filed Jun. 7, 2019 and assigned to the assignee hereof, the contents of which are hereby incorporated by reference in its entirety.

TECHNICAL FIELD

Embodiments presented in this disclosure generally relate to handling changes in network traffic routing at network fabric borders. More specifically, embodiments disclosed herein relate to convergence of traffic handling and routing policies at border nodes during network changes.

BACKGROUND

In some networks, such as software-defined networks (SDNs), propagating routing policies and functions can cause delays in traffic transmission when a change in the network is implemented. These delays can cause disruption in the transmission of the network traffic between internal network fabrics in the SDN and external networks. In some examples, the delayed network traffic causes congestion, dropped packets, and other network problems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for network traffic convergence in a network, the method including: transmitting, from a first border node in the network, a default router registration for a first external traffic connection to a mapping function in the network; receiving, from the mapping function, a first map notification indicating the first border node is registered as a default router for the first external traffic connection; establishing a first backup path to a second border node for the first external traffic connection; detecting, at the first border node, a change in the first external traffic connection; routing, at the first border node, network traffic for the first external traffic connection via the first backup path; and transmitting a default router deregistration for the first external traffic connection to the mapping function in the network. Other embodiments of this aspect include corresponding computer systems, apparatus, and computer programs recorded on one or more computer storage devices, each configured to perform the actions of the methods.

One general aspect includes a system for network traffic convergence in a network, including: a processor; and a memory including instructions which, when executed on the processor, performs an operation, the operation including: transmitting, from a first border node in the network, a default router registration for a first external traffic connection to a mapping function in the network; receiving, from the mapping function, a first map notification indicating the first border node is registered as a default router for the first external traffic connection; establishing a first backup path to a second border node for the first external traffic connection; detecting, at the first border node, a change in the first external traffic connection; routing, at the first border node, network traffic for the first external traffic connection via the first backup path; and transmitting a default router deregistration for the first external traffic connection to the mapping function in the network.

One general aspect includes a computer program product for network traffic convergence in a network, the computer program product including a non-transitory computer-readable medium program having program instructions embodied therewith, the program instructions executable by a processor to perform an operation including: transmitting, from a first border node in the network, a default router registration for a first external traffic connection to a mapping function in the network; receiving, from the mapping function, a first map notification indicating the first border node is registered as a default router for the first external traffic connection; establishing a first backup path to a second border node for the first external traffic connection; detecting, at the first border node, a change in the first external traffic connection; routing, at the first border node, network traffic for the first external traffic connection via the first backup path; and transmitting a default router deregistration for the first external traffic connection to the mapping function in the network.

Example Embodiments

In communication networks, both in SDNs and traditional networks, changes in network connections are common. For example, a network connection and/or the various network elements providing connections may go down or offline due to connectivity problems, maintenance, updates, etc. While these changes are common and expected, ensuring that network traffic is still transmitted and delivered to various destinations remains an ongoing challenge for network providers.

To address these challenges, network operators strive to provide quick routing updates and/or routing convergence as to the various network elements/components to provide efficient transmission of network traffic. For example, when a specific leg of a traffic route goes down, alternate routes are identified and utilized for network traffic. The time between when the alternate routes are identified and when the alternate routes are propagated through the network can create network traffic problems.

In some cases, such as in a Software Defined-Access (SDA) fabric networks, fast border convergence for border nodes on the edge of the network is important to avoid traffic loss during network changes and transitions. When a network transition or change occurs and the various routes are not quickly updated, the network may experience traffic disruption in several different circumstances. For example, in a network fabric, traffic may be disrupted when a new border node joins a network fabric and provides connectivity to an external network, an existing border node loses connectivity to an external network, a border node loses reachability to a fabric underlay, and/or a border node goes offline for reloads and/or software upgrades among other examples. Traffic loss may occur in these scenarios when the network does not quickly converge routing and traffic handling policies among the various border nodes and other components at the fabric edges.

These problems may become more severe when external links to a network at the border nodes are software defined-wide area networks (SD-WANs) and service providers (SPs) using extranet (e.g., SP virtual routing functions (VRF) and virtual networks (VNs) across multiple subscribers). Since these links span across multiple domains/segments from an SDA fabric to SD-WANs/SPs across VRFs, it is often difficult to detect and propagate failure indications and other network changes from one provider domain (e.g., a SD-WAN provider VRF) to multiple subscriber domains (e.g., SDA fabric subscriber VRFs). In some examples, the traffic and routing functions using the changed/failed connections cannot quickly choose alternate paths in all subscriber domains to avoid any traffic loss. Therefore in some network fabrics, traffic loss occurs between the time of a network change (e.g., problem detection in an external connection) and switching to an alternate path.

The systems and methods described herein provide for a network with external connections to minimize traffic loss and other disruptions by quickly switching/converging to alternate border nodes with valid connections, and establishing a network traffic redirection/backup path from an inoperative border node to an operative border node with a corresponding external connection. This backup path provides for a path for network traffic while additional traffic from the network is rerouted to operative border nodes.

Figure 1:
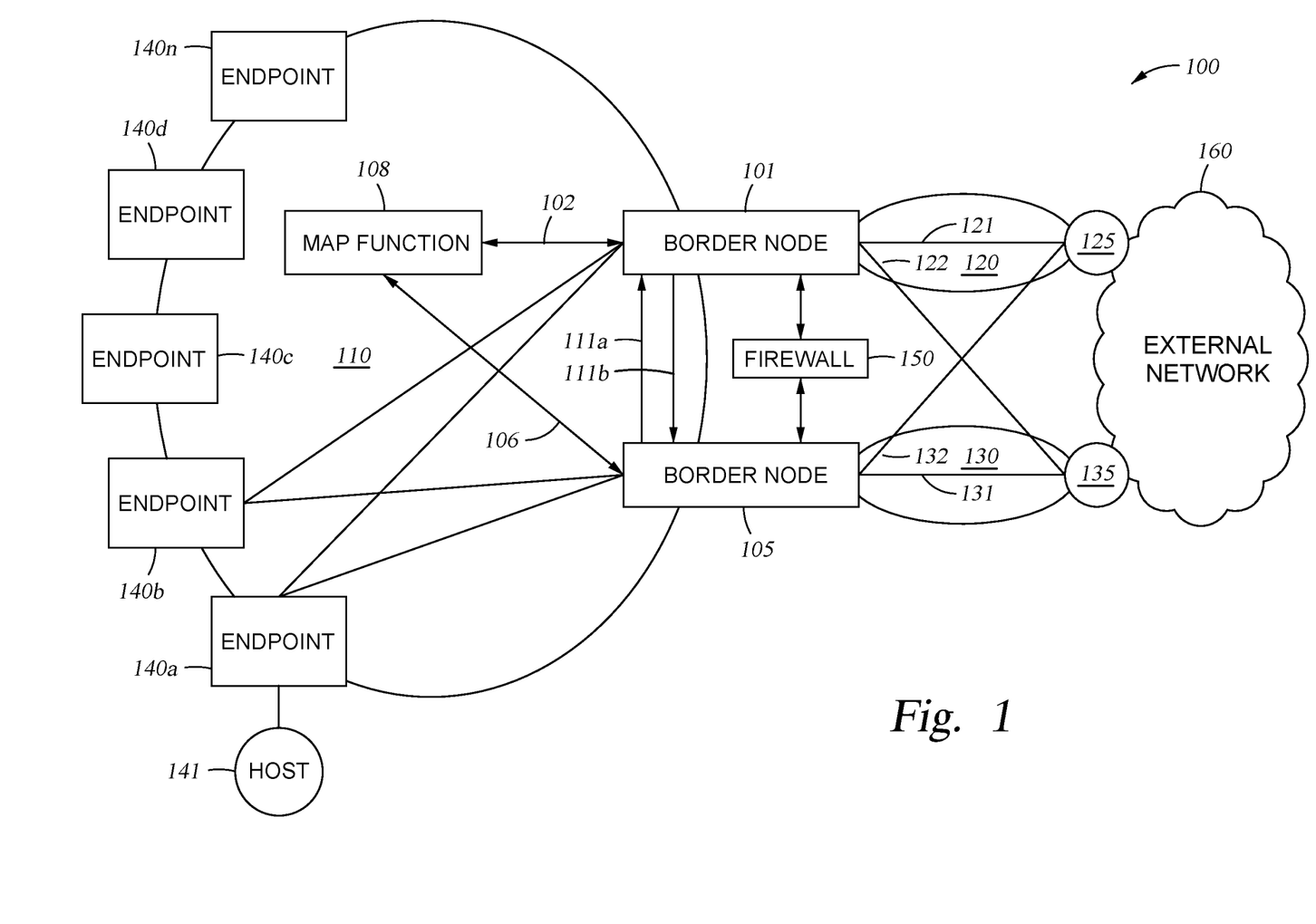
FIG. 1 illustrates a networking system, according to one embodiment.

FIG. 1 illustrates a networking system, according to one embodiment. The networking system, network 100, includes a border node 101 and a border node 105 in a fabric 110. In some examples, the border nodes 101 and 105 serve as an external ingress and egress functions for the fabric 110 routing network traffic into and out of the fabric 110. In some examples, the network 100 utilizes software to form the SD networks. For example, the fabric 110 may include an internal SDA fabric including the endpoints 140a-140n. In an example where the fabric 110 is an SDA fabric, the endpoints 140a-n include associated endpoint identifiers (EIDs) for identification in the fabric 110. In some examples, the SDA fabric includes a network such as a data-center, intra-net, etc. In some examples, the endpoints 140a-140n are routers providing network connectivity to various traffic sources such as a host 141 via the fabric 110. In some examples, the hosts such as the host 141 generate traffic intended for an external network outside of the fabric 110.

To provide external network connectivity, the border nodes 101 and 105 are associated with external traffic connections such as an external route 120 associated with the border node 101 and the external route 130 associated with the border node 105. In some examples, the external routes 120 and 130 are SD-WANs and/or networks provided by one or more service providers providing access to an external network 160 via the external connection nodes 125 and 135. In some examples, the external network 160 includes external networks such as the internet, a service provider external network, and/or another SDA fabric external to the fabric 110 providing external network access to the fabric 110.

The border nodes 101 and 105 maintain connections to the external network 160 through the external routes 120 and 130 via the network connections 121 and 131 respectively. In some examples, the border nodes 101 and 105 also maintain alternate connections to the external network 160 through the alternate external connections 122 and 132.

The network 100 also includes a firewall function such as firewall 150. In some examples, the firewall 150 injects/sends routes/policies to the border nodes 101 and 105. For example, in one embodiment, the firewall routes at border node 101 are configured to send/route all network traffic sent from the fabric 110 and all network traffic from outside the fabric 110 sent via the border node 101 to the firewall 150. After applying a firewall policy, the firewall 150 sends allowed network traffic back to the border node 101 for further routing to the fabric 110 and/or the external route 120. In some examples, a defined extranet is used for selective firewalls across VRF communication at the border nodes. For example, only a select portion of network traffic sent/received at the border nodes 101 and 105 may be sent to the firewall 150.

To provide efficient traffic handling, in some examples the fabric 110 includes the map function 108. For example, in a SDA fabric the map function 108 includes a map server-map resolver (MSMR) in communication with the border nodes 101 and 105 (via a connection 102 and a connection 106) and the endpoints 140a-n. In some examples, the map function 108 serves as a MSMR and maintains and/or stores multiple extranet policies or virtual routing functions (VRF) for communicating with the external network 160 (and within the fabric 110). The extranet policies define an external traffic route and the associated external connection with the extranet. For example, a first extranet, Extranet1, is defined by the map function 108 as: [Provider: VRF3 associated with external route 120, Subscriber: VRF1 associated with fabric 110]. In other words, the Extranet1 is defined as a route from the fabric 110 to the external network 160 via the external route 120. The map function 108 also defines a second extranet, Extranet2: [Provider: VRF4 associated with external route 130, Subscriber: VRF1]. The Extranet2 is defined as a route from the fabric 110 to the external network 160 via the external route 130. The map function may also define a dynamic Default egress tunneling routers (ETR) for unknown EIDs. For example, the map function 108 may dynamically define a route for an unknown EID through the external routes. Various process for network traffic handling including use of the extranet policies are described in relation to FIG. 2.

Figure 2:
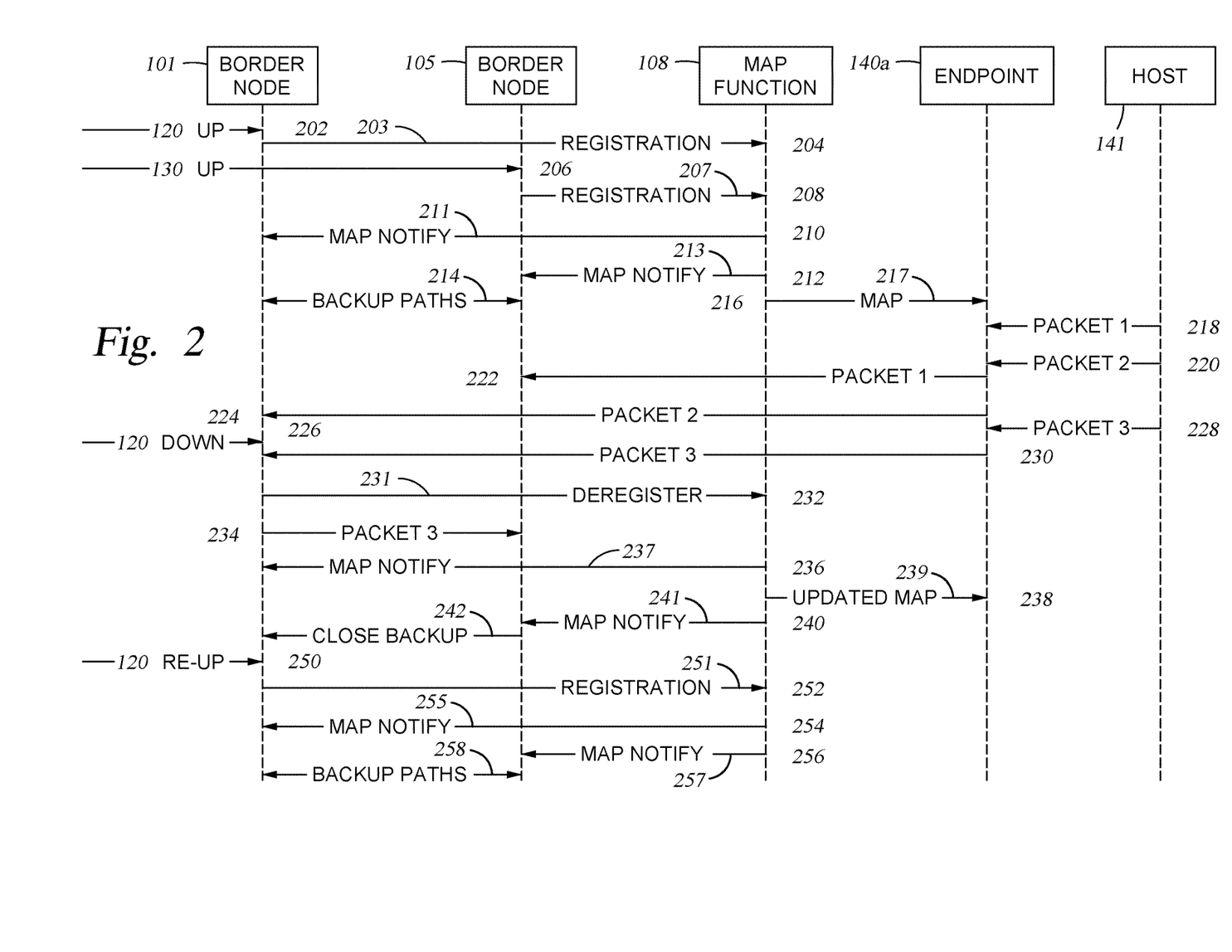
FIG. 2 illustrates a system flow diagram for network traffic convergence, according to one embodiment.

FIG. 2 illustrates a system flow diagram for network traffic convergence, according to one embodiment. With reference to the components of the network 100 described in FIG. 1, at steps 204 and 208, the border nodes 101 and 105 send registration messages 203 and 207 to the map function 108 to identify the resources and network connections available at the border nodes 101 and 105 respectively.

In some examples, the registration messages 203 and 207 include default router registration requests for external traffic connections and/or extranet policy stored at the map function 108. For example, the registration message at step 204 is transmitted by the border node 101 when the external route 120 comes on line at the border node 101 and receives a route 120-up message such as shown at step 202. In response to the external route 120 coming on line, the border node 101 registers itself as a "Default ETR in VRF3" via the registration message 203 at step 204 (i.e., the border node 101 serves as the default router for network traffic using the Extranet1 and/or external route 120). In response to the registration message 203, the fabric control plane in the fabric 110 and/or the map function 108 responds with a map notification message, map notify 211, at step 210 notifying and assigning the border node 101 as the default ETR for the external route 120. The extranet policy is updated and stored at the map function 108. In an example, where the map function 108 determines not to assign the border node 101 as the default ETR/router for the external route 120, the map notify 211 includes a rejection of the registration.

Similar to the registration message 203, the border node 105 transmits the registration message 207 when the external route 130 comes on line at the border node 105, such as when the border node 105 receives the route 130-up message at step 206. In response to the 130-up message, the border node 105 registers itself as a "Default ETR in VRF4" via the registration message at step 208. The fabric control plane in the fabric 110 and/or the map function 108 responds with a map notification, map notify 213 at step 212 notifying and assigning the border node 105 as the default ETR for the external route 130. In some examples, the map notify 211 and 213 include consolidated/merged map notifications which include an identification of all active and/or healthy border nodes in the fabric 110. These border active and/or health border nodes serve as potential nodes for backup paths.

The default ETRs (e.g., border node 101 for external route 120 and border node 105 for external route 130) serve as the default routers for the various network traffic generated at the hosts and/or endpoints 140a-n and destined for the respective external connections. At step 216 the map function 108 sends the various endpoints in the fabric 110, such as the endpoint 140a, a map 217 of the various network connections, including the default ETRs for the external connections. The map 217 includes routing tables, policies, and other network traffic handling information. At step 218, the host 141 transmits a packet 1 destined for the external network 160 via Extranet2 or the external route 130. In some examples, the map 217 is sent as a map reply message to the endpoint 140a in response to a request from the endpoint 140a for a map request (not shown) which is sent from the endpoint 140a in response to the reception of the packets at steps 218 and 220. The endpoint 140a uses the map 217 received at step 222 to determine a route for the packet 1 and sends the packet 1 to the default router, border node 105, for the external route 130. Likewise, at step 220, the host sends a packet 2 destined for the external network via the external route 120 (e.g., using Extranet1). The endpoint 140a uses the map received at step 216 to determine a route for the packet 2 and sends the packet 2 to the default router, border node 101, for the external route 120 at step 224.

Returning back to steps 210 and 212, the map notifications, map notify 211 and 213, may also include the default router assignments for the other external connections and/or a general identification of other external routes from the fabric 110 (e.g., map notify 213 includes border 105 as default ETR for external route 130, etc.). As described herein, upon receiving the map notifications, map notify 211 and 213, at step 214 the border nodes 101 and 105 establish one or more backup paths such as backup paths 111a and 111b shown in FIG. 1. In some examples, the backup paths 111a-b are paths for routing traffic routed towards the external network 160 via the other border node when a connectivity or other problem arises in the network.

In some examples, when a connectivity issue occurs (e.g., a connection loss, network congestion, etc.) on the external route 120, the border node 101 begins routing network traffic via the backup path 111b to the border node 105. For example, at step 226, the border node 101 receives a connection-120-down notification indicating the external route 120 is down and/or experiencing connection issues (e.g., congestion, intermittent connection, etc.). The border node 101, using the 120 down notification may detect an external connectivity problem for the first external traffic connection, network traffic congestion in the first external traffic connection, a node change at the first border node (e.g., the node is undergoing maintenance etc., and/or a configuration change in the first external traffic connection.

In some examples, in the event that the external route 120 and/or the border node 101 is experiencing network connectivity issues, the border node 101 deregisters itself as Default ETR for the (VRF3) at fabric control plane and/or the map function 108. For example, at step 232, the border node 101 sends a deregistration message 231 to the map function 108. In response to the deregistration message 231, the map function 108 deregisters the border node 101 as the default ETR for the external route 120 and sends a notification such as map notify 237 to the border node 101 at step 236 indicating the border node 101 is deregistered as the default ETR. In some examples, the map function 108 also installs an away table entry at border node 101 for the fabric 110 (VRF1) indicating to subsequent received traffic at the border node 101, that network traffic for the external network 160 cannot be handled by the border node 101.

In some examples, the border node 101 continues to receive network traffic intended for the external route 120 before the endpoints 140a-n are notified of the updated routes by the map function 108. For example, the host 141 sends the packet 3 to the endpoint 140a at step 228. The endpoint 140a at step 230 uses the map 217 (which has not been updated to indicate that the external route 120 is unavailable at border node 101) to send the packet 3 to the border node 101. To mitigate or prevent traffic loss and/or packet drops, the border node 101 routes the packet 3 to the border node 105 via the backup path 111b at step 234. Border node 105 in turn routes the network traffic, such as the packet 3, received from the border node 101 via the backup path 111b to the external network 160 (either through the external route 130 and/or alternate connections).

Upon receiving the deregistration message 231, the map function 108 also sends a map-notification, i.e., map notify 241, to the border node 105 to terminate the backup path 111a towards the border node 101 at step 242, since the backup path 111a cannot be used for traffic headed for an external network received at border node 105 since the external route 120 is unavailable. The map function 108 also sends an updated map 239 to the endpoints, such as endpoint 140a, at step 238 to converge the routing and extranet policies at the network elements. The endpoints use the updated map 239 to update routing tables/policies and cease routing traffic for external networks to the border node 101.

In some examples, the external route 120 may come back online at the border node 101. For example, the border node 101 receives the connection-120-re-up message at step 250, indicating the external route is again available at the border node 101. In response to the external route 120 coming back online, the border node 101 re-registers itself as a "Default ETR in VRF3" via the re-registration message 251 at step 252. In response to the re-registration message 251, the fabric control plane in the fabric 110 and/or the map function 108 responds with a map notification message, i.e., map notify 255, at step 254 notifying and assigning the border node 101 as the default ETR for the external route 120. In some examples, the map function 108 updates and/or stores the extranet policy. The map function 108 also transmits the map notify 257 at step 256 including an indication that the external route 120 is available at border node 101.

At step 258, the backup path 111a (and 111b) is re-established from the border node 105 to the border node 101. Additionally, in a similar manner to the map 217 and updated map 239, the map function 108 updates the endpoints 140a-140n with updated routing tables to indicate the border node 101 is again assigned the default ETR/router for the external route 120.

Figure 3:
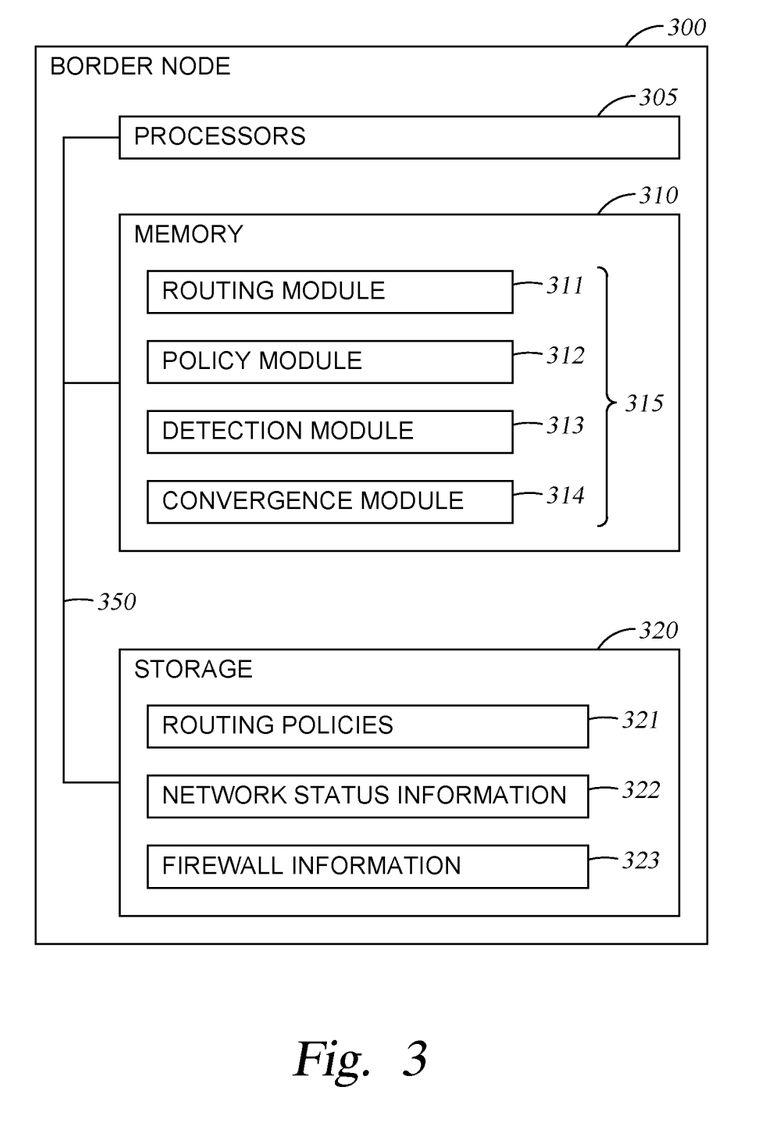
FIG. 3 is a block diagram of a border node in a network, according to one embodiment.

FIG. 3 is a block diagram of a border node in a network, according to one embodiment. As shown in FIG. 3, the border node 300 may include a router embodied as server/computer/etc., which executes the functions of the border nodes 101 and 105 shown in FIG. 1, and perform the methods described in FIGS. 2 and 4-7. The components of border node 300 may include, but are not limited to, one or more processing units or processors 305, a system memory 310, a storage system 320, a bus 350 that couples various system components including the system memory 310 and storage system 320 to processors 305 along with a network interface and input/output interface (not shown). In some embodiments, border node 300 is distributed and includes a plurality of discrete computing devices that are connected through wired or wireless networking.

System memory 310 may include a plurality of program modules 315 for performing various functions related to connecting a user device to a protected network, described herein. The program modules 315 generally include program code that is executable by one or more of the processors 305. As shown, the program modules 315 include a routing module 311, a policy module 312, a detection module 313, and a convergence module 314. In some examples, the program modules 315 may be distributed and/or cloud based applications/modules. Additionally, storage system 320 may include media for storing routing policies 321, network status information 322, firewall information 323, and other information. The information stored in storage system 320 may be updated and accessed by the program modules 315 described herein.

Figure 4:
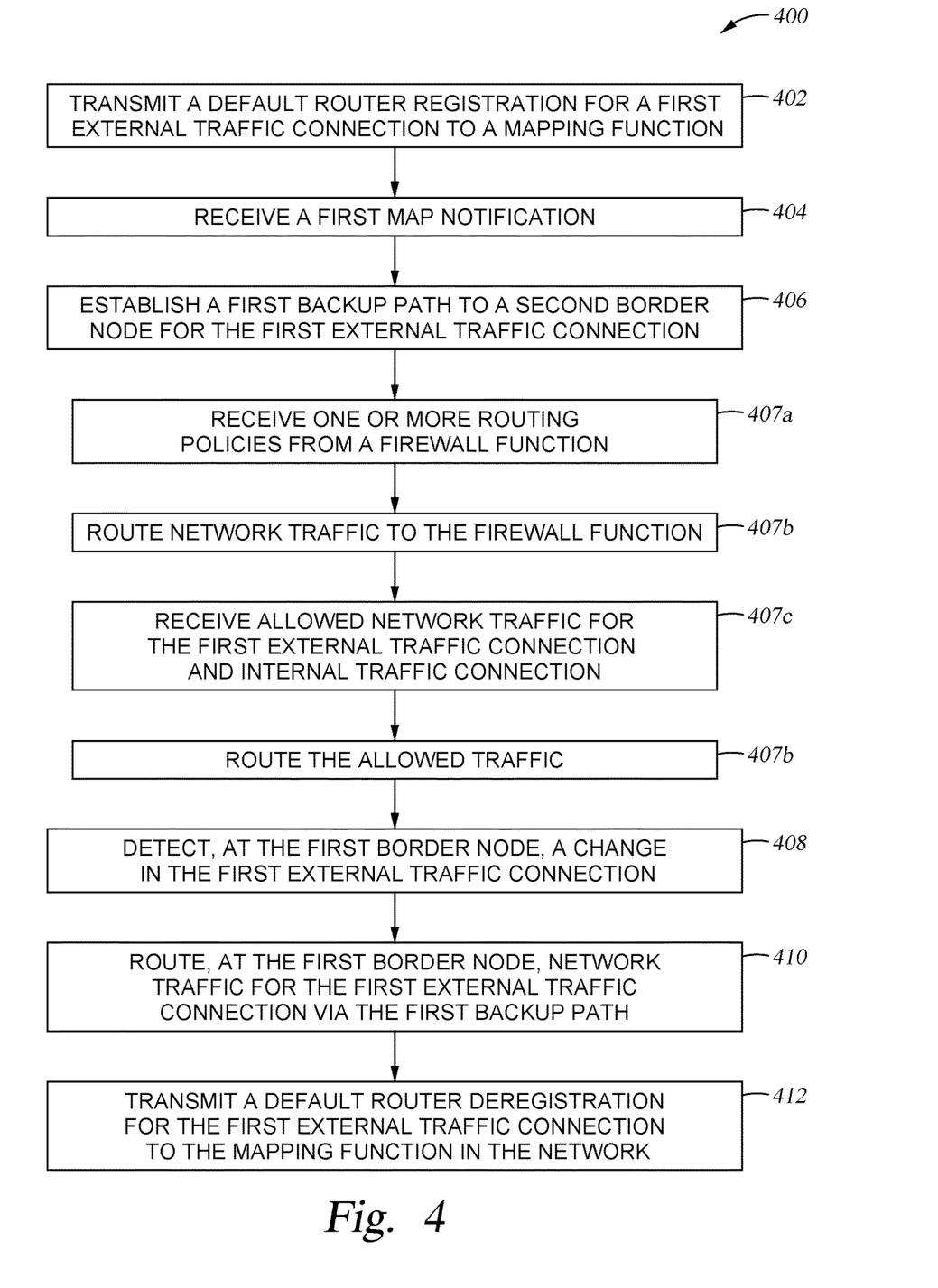
FIG. 4 is a method for network traffic convergence, according to one embodiment.

FIG. 4 is a method 400 for network traffic convergence, according to one embodiment. The method 400 may be performed at any border node in the fabric 110. For example, the border node 101 and/or the border node 105 may perform the steps of the method 400. For the purpose of illustration, method 400 will be described as being performed at the border node 101 herein. Method 400 begins at block 402 where the policy module 312 transmits a default router registration for a first external traffic connection to a mapping function in the network. For example, as shown in FIG. 2, the border node 101 transmits the registration message 203 to the map function 108 at step 204 to register as the default router and/or ETR for the Extranet1. In some examples, the registration message 203 is sent in response to receiving a 120 up message at step 202, indicating that the external route 120 is available. The 120 up message may include any indication that the external route 120 is available for use by the border node 101.

At block 404, the policy module 312 receives, from the mapping function, a first map notification indicating a second border node is registered for a second external connection. In some examples, the first map notification also includes an acknowledgement that the first border node is registered as a default router for the first external traffic connection. For example, at step 210 of FIG. 2, the map function sends the map notify 211 to the border node 101 indicating that the border node 101 is the default ETR for the external route 120 and other information including all known default router registrations at the map function 108, including the second border node for the second external connection. In some examples, the border node 101 begins receiving and routing network traffic for the external route 120 upon being set as the default router for the Extranet1. For example, the border node 101 receive the packet 2 and routes the packet 2 to the external network via the external route 120.

At block 406, the convergence module 314 establishes a first backup path to the second border node for the first external traffic connection. For example, the convergence module 314 establishes the backup path 111b as shown in FIG. 1, at step 214 as described in FIG. 2, using the default router registration information received in the map notify 211 as described in relation to block 404. In some examples, the backup path 111b is established in along with the backup path 111a, where the backup paths 111a and 111b function as traffic tunnels between the border nodes 101 and 105 for network traffic.

In some examples, the method 400 includes routing network traffic via a firewall function to provide network security. At block 407a, the policy module 312 receives one or more routing policies from a firewall function on the network, such as the firewall 150. At block 407b, the routing module 311 routes the network traffic for the first external traffic connection and network traffic for a first internal network to the firewall function as shown in FIG. 1. At block 407c, the routing module 311 receives allowed network traffic for the first external traffic connection (e.g., the external route 120) and allowed network traffic for a first internal traffic connection (e.g., traffic bound for the fabric 110) from the firewall function. At block 407d, the routing module 311 routes the allowed traffic for the first external traffic connection and allowed traffic for the first internal traffic connection from the firewall function via the first external traffic connection or the first internal traffic connection.

When a network connection fails, the border node begins the process to converge the traffic routing policies in the network fabric. Method 400 includes at block 408, detecting, at the first border node, a change in the first external traffic connection. The border node 101 may detect a change in the function of the border node itself and/or receive an indication that the external connection has changed. For example, at step 226 in FIG. 2, the border node 101 receives the 120 down message indicating a problem in the external route 120. In some examples, the detection module 313 detects, using the 120 down message and other information at the border node 101 an external connectivity problem for the first external traffic connection, detects network traffic congestion in the first external traffic connection, detects a node change at the first border node, and/or detects a configuration change in the first external traffic connection. Each of the changes indicates that the border node 101 is unable to efficiently transmit network traffic via the external route 120.

At block 410, the routing module 311 routes, at the first border node, network traffic for the first external traffic connection via the first backup path. For example, as described in FIG. 2, the border node 101 transmits the network traffic (e.g., packet 3) to the border node 105 via the backup path 111b.

At block 412, the convergence module 314 transmits a default router deregistration for the first external traffic connection to the mapping function in the network. For example, as described in FIG. 2, at step 232, the border node 101 transmits the deregistration message 231 to the map function 108. In some examples, the border node 101 continues transmitting traffic received at the border node 101 via the backup path 111b until the various endpoints in the fabric 110 are notified of alternate routing paths.

Figure 5:
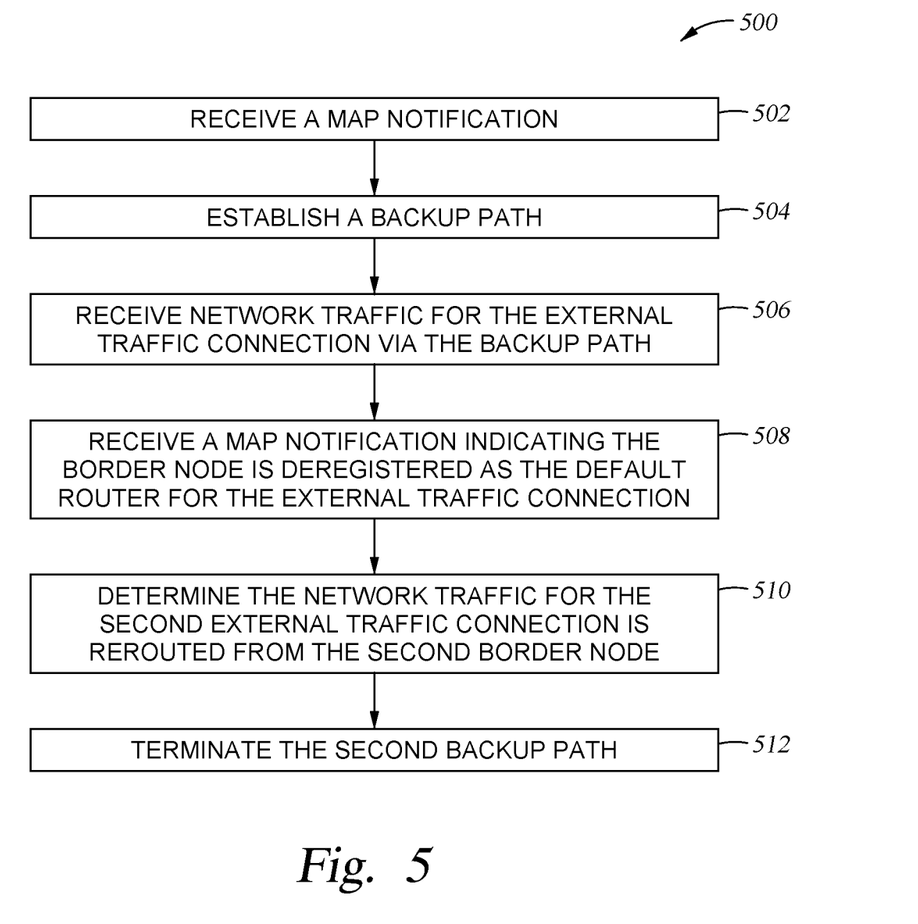
FIG. 5 is a method for network traffic convergence for a backup path, according to one embodiment.

FIG. 5 is a method 500 for network traffic convergence for a backup path, according to one embodiment. The method 500 may be performed at any border node in the fabric 110. For example, the border node 101 and/or the border node 105 may perform the steps of the method 500. For the purpose of illustration, method 500 will be described as being performed by the border node 105. Method 500 begins at block 502 where the policy module 312 receives a map notification indicating a border node is registered as a default router for an external traffic connection. For example, at step 212, the map notify 213 may include an indication that external connections are available at the other border nodes (e.g., external route 120 is available at border node 101). At block 504, the convergence module 314 establishes a backup path to one of the other border nodes. For example, the backup path 111a is established from the border node 105 to the border node 101 at step 214 of FIG. 2. In some examples, the backup path 111a is established with the backup path 111b.

At block 506, the routing module 311 receives network traffic for the external traffic connection via the second backup path. For example, at step 234, the border node 105 receives the packet 3 from the border node 101 via the backup path 111b.

At block 508, the policy module 312 receives a map notification indicating the other border node is deregistered as the default router for the second external traffic connection. For example, at step 240, the border node 105 receives the map notify 241 from the map function 108. In some examples, the map notify 241 includes updated routing information related to the border node 101 and the border node 105 among other border node options in the fabric 110.

At block 510, the convergence module 314 determines from the map notification that the network traffic for the second external traffic connection is rerouted from the other border node and/or that the external connection is not available via the border node 101. At block 512, the convergence module 314 terminates the second backup path. For example, at step 242 in FIG. 2, the border node 105 closes the second backup path, the backup path 111b, to prevent the border node 105 from relying on a non-functioning backup path. In some examples, the backup path 111a is also terminated when the border node 105 is notified by the border node 101 and/or the map function 108 that further traffic will not be transmitted via the backup path 111a.

Figure 6:
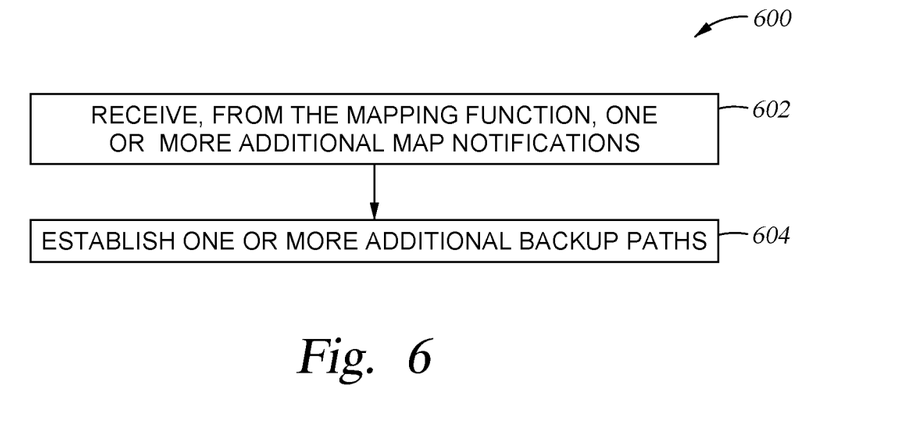
FIG. 6 is a method for establishing additional backup paths for a plurality of network connections, according to one embodiment.

FIG. 6 is a method 600 for establishing additional backup paths for a plurality of network connections, according to one embodiment. Method 600 begins at block 602, where the policy module 312 receives, from the mapping function, one or more additional map notifications indicating one or more additional default routers for additional external traffic connections. At block 604, the convergence module 314 establishes one or more additional backup paths to one or more additional border nodes for each of the additional external traffic connections. For example, the border node 101 and/or border node 105 may also register as a default ETR/router for other external routes not shown in FIG. 1.

Figure 7:
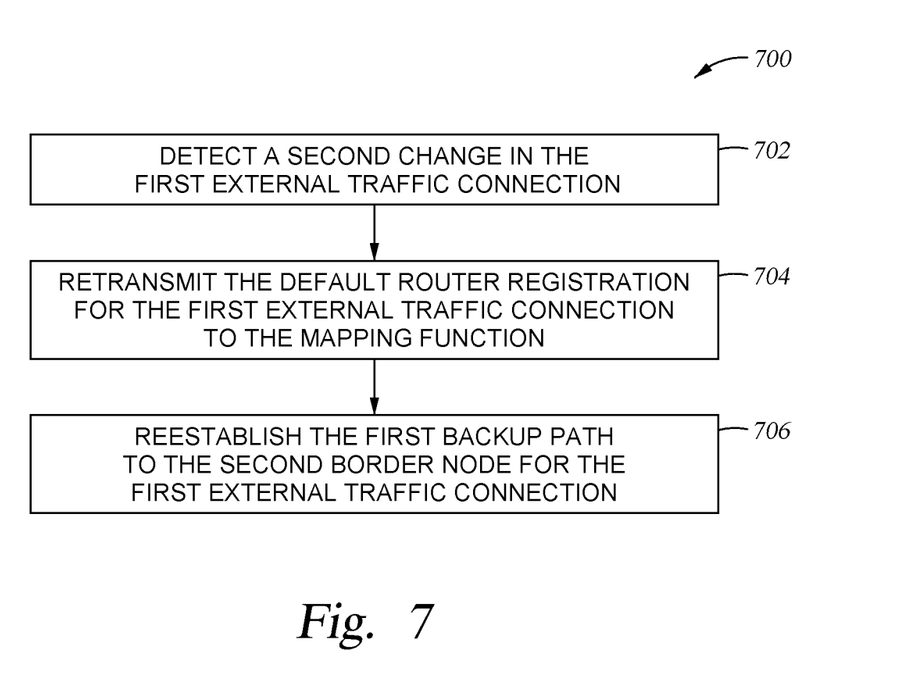
FIG. 7 is a method for reestablishing a default router for a border node, according to one embodiment.

FIG. 7 is a method 700 for reestablishing a default router for a border node, according to one embodiment. Method 700 begins at block 702, where the detection module 313 detects, at the border node, a second change in the first external traffic connection, wherein the second change indicates the first external traffic connection is available at the first border node. For example, the border node 101 receives the 120 re-up message at step 250.

At block 704, the policy module 312 retransmits, from the first border node in the network, the default router registration for the first external traffic connection to the mapping function in the network. In response to the external route 120 coming on line, the border node 101 re-registers itself as a "Default ETR in VRF3" via the re-registration message 251 at step 252. In response to the re-registration message 251, the fabric control plane in the fabric 110 and/or the map function 108 responds with a map notification message, map notify 255, at step 254 notifying and assigning the border node 101 as the default ETR for the external route 120. The extranet policy is updated and stored at the map function 108. The map function 108 also transmits the map notify 257 at step 256 including an indication that the external route 120 is available at border node 101.

At block 706, the convergence module 314 reestablishes the first backup path to the second border node for the first external traffic connection. For example, the backup path 111a (and 111b) is re-established from the border node 105 to the border node 101 at step 258 of FIG. 2. In a similar manner to the map 217 and updated map 239, the endpoints 140a-140n are updated with updated routing tables to indicate the border node 101 is again assigned the default ETR/router for the external route 120.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As described above, including in relation to FIG. 3, various computing components may be included to perform the methods described herein. For example, bus 350 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, border node 300 typically includes a variety of computer system readable media. Such media may be any available media that is accessible by border node 300, and it includes both volatile and non-volatile media, removable and non-removable media.

System memory 310 can include computer system readable media in the form of volatile memory, such as random access memory (RAM) and/or cache memory. Border node 300 may further include other removable/non-removable, volatile/non-volatile computer system storage media. In some examples, storage system 320 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 by one or more data media interfaces.

As depicted and described above, system memory 310 may include at least one program product having a set (e.g., at least one) of program modules 315 that are configured to carry out the functions of embodiments of the invention. Border node 300 may further include other removable/non-removable volatile/non-volatile computer system storage media. In some examples, storage system 320 may be included as part of system memory 310 and may typically provide a non-volatile memory for the networked computing devices, and may include one or more different storage elements such as Flash memory, a hard disk drive, a solid state drive, an optical storage device, and/or a magnetic storage device.

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   transmitting, from a first border node in a network, a registration message for a first external traffic connection to a mapping function in the network, wherein the mapping function is an independent function, and wherein the mapping function maintains multiple extranet policies for the network;
   receiving, from the mapping function, a first map notification indicating a second border node in the network is registered for a second external traffic connection;
   establishing a first backup path from the first border node to the second border node for the first external traffic connection;
   detecting, at the first border node, a change in the first external traffic connection;
   routing, at the first border node, network traffic for the first external traffic connection via the first backup path; and
   transmitting a deregistration message for the first external traffic connection to the mapping function in the network.

2. The method of claim 1, further comprising:
   establishing a second backup path from the second border node to the first border node for the second external traffic connection;
   receiving network traffic for the second external traffic connection via the second backup path;
   receiving a third map notification indicating the second border node is deregistered for the second external traffic connection;
   determining from the third map notification that the network traffic for the second external traffic connection is rerouted from the second border node; and
   terminating the second backup path.

3. The method of claim 1, further comprising:
   receiving one or more routing policies from a firewall function on the network;
   routing the network traffic for the first external traffic connection and network traffic for a first internal network to the firewall function;
   receiving allowed network traffic for the first external traffic connection and allowed network traffic for a first internal traffic connection from the firewall function; and
   routing the allowed network traffic for the first external traffic connection and allowed traffic for the first internal traffic connection from the firewall function via the first external traffic connection or the first internal traffic connection.

4. The method of claim 3,
   wherein the first internal network comprises an internal software-defined (SD) network fabric; and
   wherein the first external traffic connection comprises a SD wide area network (WAN) connection to an external network.

5. The method of claim 1, wherein detecting the change in the first external traffic connection comprises one or more of:
   detecting an external connectivity problem for the first external traffic connection;
   detecting network traffic congestion in the first external traffic connection;
   detecting a node change at the first border node; and
   detecting a configuration change in the first external traffic connection.

6. The method of claim 1, further comprising:
   receiving, from the mapping function, one or more additional map notifications indicating one or more additional default routers for additional external traffic connections; and
   establishing one or more additional backup paths to one or more additional border nodes for each of the additional external traffic connections.

7. The method of claim 1 further comprising:
   detecting, at the first border node, a second change in the first external traffic connection, wherein the second change indicates the first external traffic connection is available at the first border node;
   retransmitting, from the first border node in the network, the registration message for the first external traffic connection to the mapping function in the network; and
   reestablishing the first backup path to the second border node for the first external traffic connection.

8. A system, comprising:
   a processor; and
   a memory comprising instructions which, when executed on the processor, performs an operation, the operation comprising:
   transmitting, from a first border node in a network, a registration message for a first external traffic connection to a mapping function in the network, wherein the mapping function is an independent function, and wherein the mapping function maintains multiple extranet policies for the network;
   receiving, from the mapping function, a first map notification indicating a second border node in the network is registered for a second external traffic connection;
   establishing a first backup path from the first border node to the second border node for the first external traffic connection;
   detecting, at the first border node, a change in the first external traffic connection;
   routing, at the first border node, network traffic for the first external traffic connection via the first backup path; and
   transmitting a deregistration message for the first external traffic connection to the mapping function in the network.

9. The system of claim 8, wherein the operation further comprises:
   establishing a second backup path from the second border node to the first border node for the second external traffic connection;
   receiving network traffic for the second external traffic connection via the second backup path;
   receiving a third map notification indicating the second border node is deregistered for the second external traffic connection;
   determining from the third map notification that the network traffic for the second external traffic connection is rerouted from the second border node; and
   terminating the second backup path.

10. The system of claim 8, wherein the operation further comprises:

receiving one or more routing policies from a firewall function on the network;
routing the network traffic for the first external traffic connection and network traffic for a first internal network to the firewall function;
receiving allowed network traffic for the first external traffic connection and allowed network traffic for a first internal traffic connection from the firewall function; and
routing the allowed network traffic for the first external traffic connection and allowed traffic for the first internal traffic connection from the firewall function via the first external traffic connection or the first internal traffic connection.

11. The system of claim 10,
wherein the first internal network comprises an internal software-defined (SD) network fabric; and
wherein the first external traffic connection comprises a SD wide area network (WAN) connection to an external network.

12. The system of claim 8, wherein detecting the change in the first external traffic connection comprises one or more of:
detecting an external connectivity problem for the first external traffic connection;
detecting network traffic congestion in the first external traffic connection;
detecting a node change at the first border node; and
detecting a configuration change in the first external traffic connection.

13. The system of claim 8, wherein the operation further comprises:
receiving, from the mapping function, one or more additional map notifications indicating one or more additional default routers for additional external traffic connections; and
establishing one or more additional backup paths to one or more additional border nodes for each of the additional external traffic connections.

14. The system of claim 8, wherein the operation further comprises:
detecting, at the first border node, a second change in the first external traffic connection, wherein the second change indicates the first external traffic connection is available at the first border node;
retransmitting, from the first border node in the network, the registration message for the first external traffic connection to the mapping function in the network; and
reestablishing the first backup path to the second border node for the first external traffic connection.

15. A computer program product comprising a non-transitory computer-readable medium program having program instructions embodied therewith, the program instructions executable by a processor to perform an operation comprising:
transmitting, from a first border node in a network, a registration message for a first external traffic connection to a mapping function in the network, wherein the mapping function is an independent function, and wherein the mapping function maintains multiple extranet policies for the network;
receiving, from the mapping function, a first map notification indicating a second border node in the network is registered for a second external traffic connection;
establishing a first backup path from the first border node to the second border node for the first external traffic connection;

detecting, at the first border node, a change in the first external traffic connection;
routing, at the first border node, network traffic for the first external traffic connection via the first backup path; and
transmitting a deregistration message for the first external traffic connection to the mapping function in the network.

16. The computer program product of claim 15, wherein the operation further comprises:
establishing a second backup path from the second border node to the first border node for the second external traffic connection;
receiving network traffic for the second external traffic connection via the second backup path;
receiving a third map notification indicating the second border node is deregistered for the second external traffic connection;
determining from the third map notification that the network traffic for the second external traffic connection is rerouted from the second border node; and
terminating the second backup path.

17. The computer program product of claim 15, wherein the operation further comprises:
receiving one or more routing policies from a firewall function on the network;
routing the network traffic for the first external traffic connection and network traffic for a first internal network to the firewall function;
receiving allowed network traffic for the first external traffic connection and allowed network traffic for a first internal traffic connection from the firewall function; and
routing the allowed network traffic for the first external traffic connection and allowed traffic for the first internal traffic connection from the firewall function via the first external traffic connection or the first internal traffic connection.

18. The computer program product of claim 15, wherein detecting the change in the first external traffic connection comprises one or more of:
detecting an external connectivity problem for the first external traffic connection;
detecting network traffic congestion in the first external traffic connection;
detecting a node change at the first border node; and
detecting a configuration change in the first external traffic connection.

19. The computer program product of claim 15, wherein the operation further comprises:
receiving, from the mapping function, one or more additional map notifications indicating one or more additional default routers for additional external traffic connections; and
establishing one or more additional backup paths to one or more additional border nodes for each of the additional external traffic connections.

20. The computer program product of claim 15, wherein the operation further comprises:
detecting, at the first border node, a second change in the first external traffic connection, wherein the second change indicates the first external traffic connection is available at the first border node;
retransmitting, from the first border node in the network, the registration message for the first external traffic connection to the mapping function in the network; and reestablishing the first backup path to the second border node for the first external traffic connection.

* * * * *

UNITED STATES PATENT AND TRADEMARK OFFICE
CERTIFICATE OF CORRECTION

PATENT NO. : 11,057,292 B1  
APPLICATION NO. : 16/566714  
DATED : July 6, 2021  
INVENTOR(S) : Prakash Jain et al.

Page 1 of 1

It is certified that error appears in the above-identified patent and that said Letters Patent is hereby corrected as shown below:

In the Specification

In Column 11, Lines 55-63, delete "Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon." and insert the same on Column 11, Line 54 as a continuation of the same paragraph.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*